United States Patent [19]
Sietmann

[11] 3,910,285
[45] Oct. 7, 1975

[54] BLOWER APPARATUS FOR A COMBINE
[75] Inventor: Vernon H. Sietmann, Laurel, Iowa
[73] Assignees: Beth Keese; Larry Keese, both of Gilman; Wanda Smith; Raymond Smith, both of Laurel, all of Iowa ; part interest to each
[22] Filed: May 3, 1973
[21] Appl. No.: 356,923

[52] U.S. Cl. .............................. 130/24; 130/27 AE
[51] Int. Cl.² .......................................... A01F 14/44
[58] Field of Search ........................................ 130/24

[56] References Cited
UNITED STATES PATENTS

| | | | |
|---|---|---|---|
| 2,692,679 | 10/1954 | Lindberg et al. | 130/24 |
| 2,694,493 | 11/1954 | Odegarden | 130/24 |
| 3,456,652 | 7/1969 | Louks et al. | 130/27 AE |
| 3,509,885 | 5/1970 | Louks et al. | 130/27 AE |

Primary Examiner—Antonio F. Guida
Attorney, Agent, or Firm—Zarley, McKee, Thomte & Voorhees

[57] ABSTRACT

A blower apparatus for a combine is disclosed for automatically leveling the grain on the chaffer unit of the combine when the combine is laterally tipped in one direction or another. Blower means is mounted on the machine and is operable by the machine to pull in air from the atmosphere and to supply the same under pressure to a valve means. The valve means comprises a housing having an inlet opening in communication with the blower means. A pair of discharge openings are formed in the housing and are in communication with a pair of conduits extending to a pair of manifolds positioned on opposite sides of the chaffer unit. A valve member is rotatably mounted in the housing for selectively opening and closing the discharge openings responsive to lateral inclination of the combine. A pendulum is mounted on the combine for sensing the lateral inclination of the combine. A linkage means interconnects the pendulum with the valve member so that the valve member will open and close the discharge openings in response to the lateral inclination of the combine to supply additional air to the low side of the chaffer unit.

8 Claims, 10 Drawing Figures

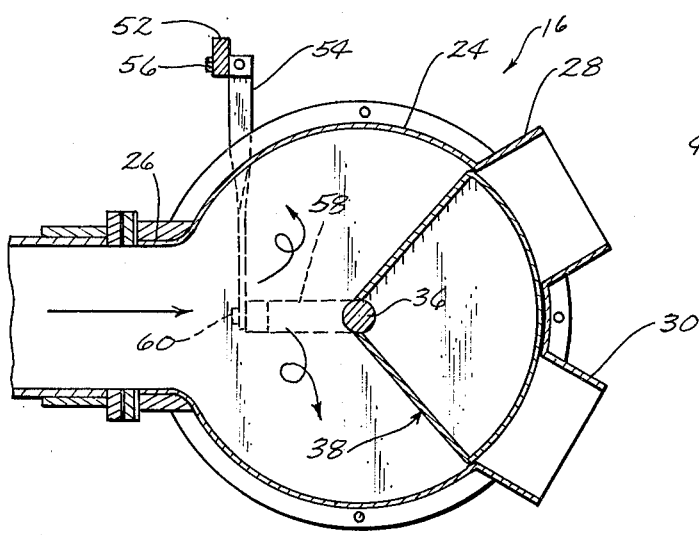
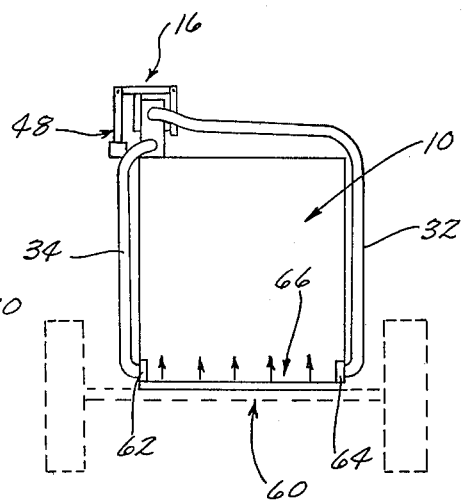
Fig. 6
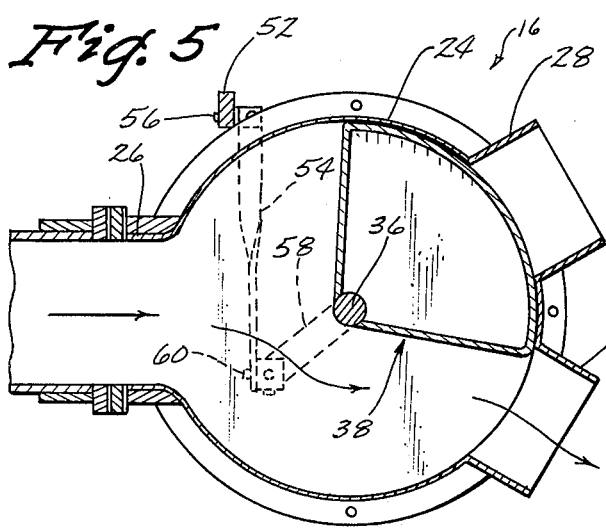
Fig. 5
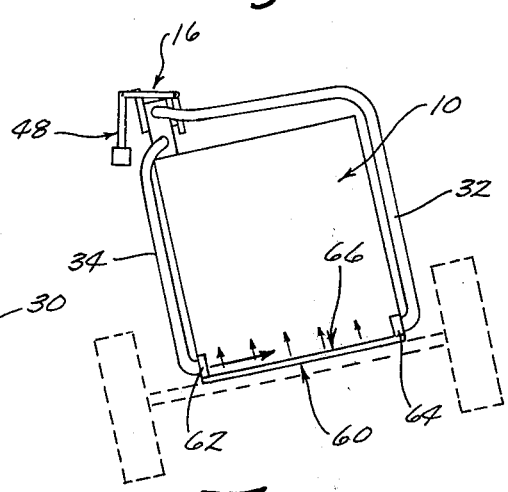
Fig. 8
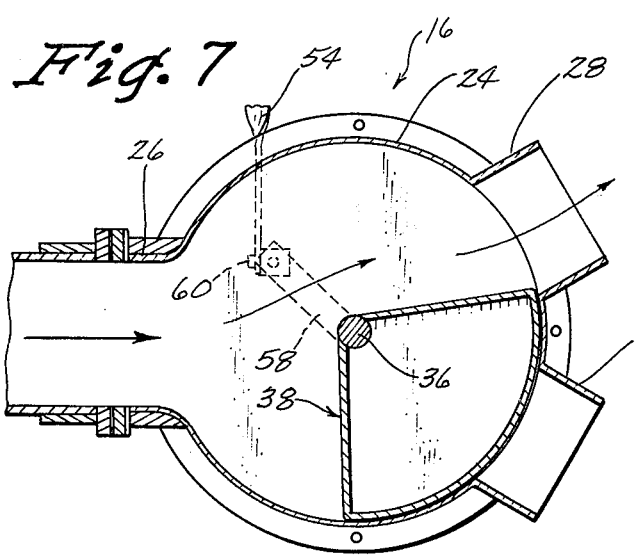
Fig. 7
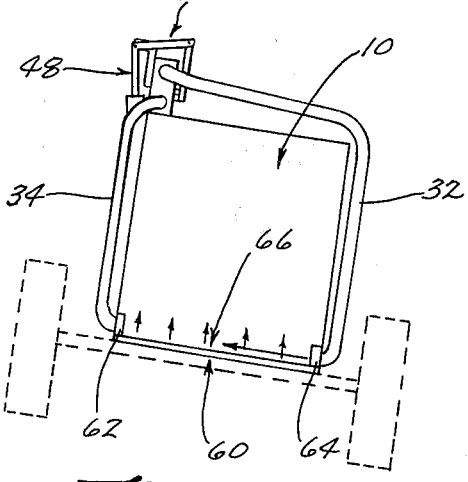
Fig. 10
Fig. 9

3,910,285

BLOWER APPARATUS FOR A COMBINE

BACKGROUND OF THE INVENTION

This invention relates generally to a blower apparatus for a combine and more particularly to an improvement in the blower devices disclosed in U.S. Pat. Nos. 3,456,652 and 3,495,598.

In recent years, the combine harvester, or harvester-thresher has become the universally accepted machine for harvesting grain crops. A conventional machine of this character comprises a body unit containing threshing and separating apparatus, which carries in front of it a header unit containing grain cutting and conveying apparatus. As the machine is moved through the field, grain cut by the cutting apparatus is conveyed to the body unit where it is threshed, and where the grain kernels are separated from the straw and chaff.

Conventional grain harvesters include as a part of the separating mechanism, horizontally disposed screens or sieves upon which the kernels, chaff, and unthreshed heads are deposited after the straw is separated from them. The screens or sieves are reciprocated rapidly in a fore and aft direction in the path of a rearwardly and upwardly directed stream of air from a fan mounted in the body unit to separate the kernels from a chaff and unthreshed heads. The small, relatively heavy kernels pass through the screens and are collected therebeneath. The light chaff is blown out of the rear end of the body unit. The unthreshed heads, being too large to pass through the screens but too heavy to be blown with the chaff, drop from the rear edges of the screens into a return auger and are collected for rethreshing.

It can readily be seen that for the separation process to be efficient so as to separate all of the kernels from the straw and chaff, the grain must be maintained in a level condition on top of at least the uppermost screen. In operation of this type machine over fairly level terrain, the problem is not too serious. One present day method of solving the present problem is by the use of laterally spaced dividers or separators extended longitudinally on top of the screens.

In hilly areas, however, the problem is more serious with losses of from five to ten bushels of grain per acre being reported due to the uneven distribution of the grain on the screens. Many solutions to this problem have been suggested with several being presently used. A great majority of these deal with mechanisms for maintaining the screens themselves level during movement of the combine over the hilly terrain.

In U.S. Pat. No. 3,456,652, a partial solution to this problem was disclosed. In that disclosure, the air dispensing manifolds were placed on opposite sides of the chaffer housing in a stationary manner, and with air under pressure, derived from a blower fan auxiliary to the underside blower fan, emitted from the manifolds transversing across the chaffer.

Continuing tests and development of that structure showed several areas of improvement. It was ascertained that certain riddles or screens are reciprocated not only fore and aft but also slightly upwardly and downwardly. Thus, the fixed manifold housing did not always force a blanket of air directly over the surface of the oscillating screens. Furthermore, material tended to lodge beneath the manifold housings and distort the same as the screens oscillated therebeneath. The valve means disclosed in U.S. Pat. No. 3,456,652 is generally satisfactory but the instant disclosure represents a significant advance thereover.

In U.S. Pat. No. 3,495,598, a valve means was disclosed for directing air to opposite sides of the chaffer unit. The valve means disclosed in said patent was likewise generally satisfactory but the valve disclosed in this application does represent a great improvement thereover.

SUMMARY OF THE INVENTION

In summary, this invention pertains to an apparatus for aiding the separation of grain from all other material therewith passing longitudinally over a chaffer unit in a conventional threshing machine. The apparatus comprises a blower driven by the machine and adapted to supply air under pressure to a valve means. The valve means has a pair of discharge openings formed therein which are in communication with manifolds positioned on opposite sides of the chaffer unit. A pendulum is secured to the combine for sensing lateral inclination of the combine and is connected to the valve member within the valve means to direct additional air to the manifold on the low side of the chaffer unit to aid in maintaining the grain in a level condition thereon.

Therefore, it is an object of this invention to provide an improved combine.

A further object of the invention is to provide a means for supplying air to the low side of the chaffer unit so that the grain will be maintained in a level condition thereon.

A further object of the invention is to provide an improved valve means for the combine blower assembly which is responsive to the lateral inclination of the combine.

A further object of the invention is to provide a valve means for a combine blower assembly which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 5 is a sectional view seen on lines 5—5 of FIG. 4:

FIG. 6 is a schematic view illustrating the relationship of the pendulum with respect to the combine when the combine is level:

FIG. 7 is a sectional view similar to FIG. 5 except that the pendulum has caused the movement of the valve member:

FIG. 8 is a schematic view similar to FIG. 6 except that the combine is shown in an inclined condition with additional air being directed to the low side of the chaffer unit:

FIG. 9 is a sectional view similar to FIG. 7 except that the pendulum has caused the valve member to open the other discharge opening; and FIG. 10 is a view similar to FIGS. 6 and 8 but which illustrates the combine in a different lateral inclination.

DESCRIPTION OF THE PREFERRED EMBODIMENT

Figure 1:
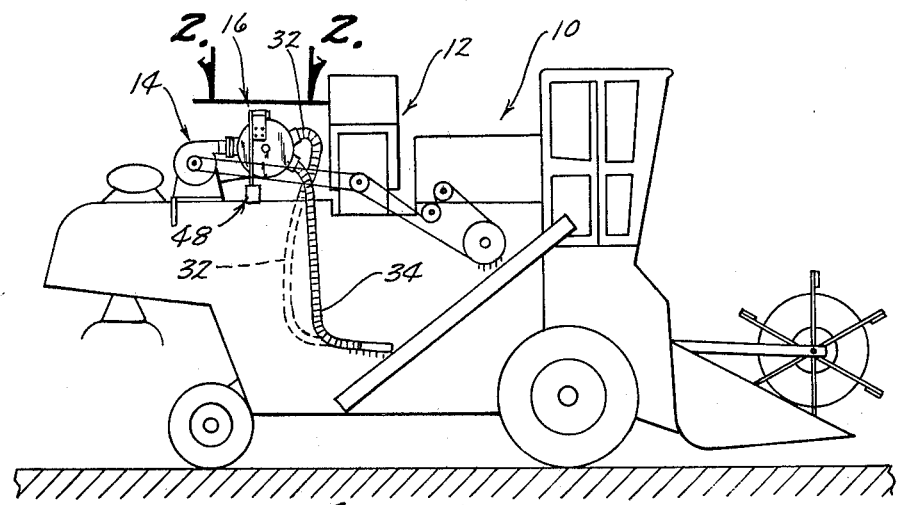
FIG. 1 is a side view of a combine having the apparatus of this invention mounted thereon.
Figure 2:
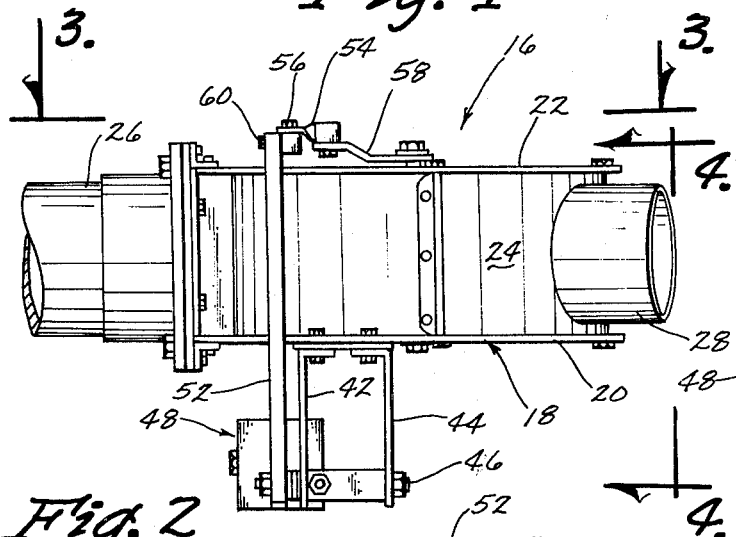
FIG. 2 is a view seen along lines 2—2 of FIG. 1.
Figure 4:
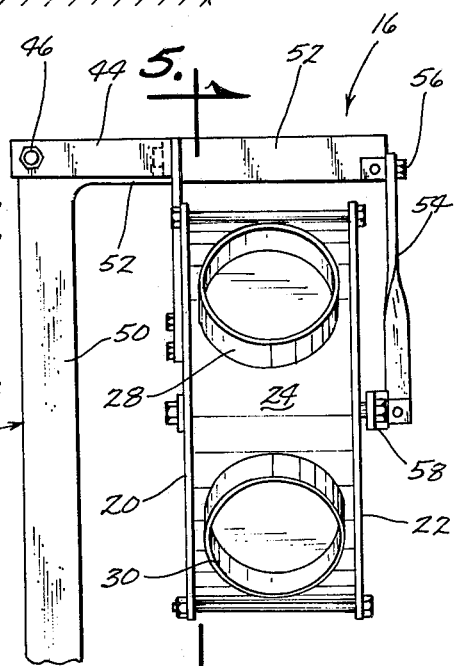
FIG. 4 is a view of the valve means as seen on lines 4—4 of FIG. 2.
Figure 3:
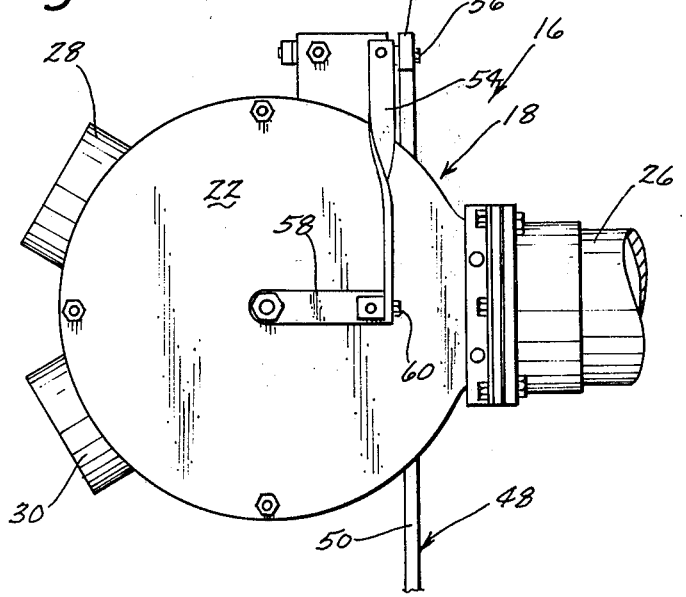
FIG. 3 is a view of the valve means as seen on lines 3—3 of FIG. 2.

The numeral 10 refers generally to a conventional combine including a motor 12. The numeral 14 refers to a blower means which is driven by motor 12 and which is adapted to pull air in from the atmosphere and supply the same under pressure to a valve means generally referred to by the reference numeral 16.

Valve means 16 comprises a cylindrical housing 18 which is operatively secured to the blower means as seen in FIG. 1. For purposes of description, housing 18 will be described as comprising oppositely disposed side wall 20 and 22 and a cylindrical peripheral wall 24. Housing 18 is provided with an intake opening or port 26 which is in communication with the blower 14 for receiving air under pressure therefrom. A pair of spaced apart discharge openings or ports 28 and 30 are formed in the forward end of wall 24 and have conduits 32 and 34 operatively connected thereto and extending therefrom.

Shaft 36 rotatably extends through the side walls 20 and 22 and has a valve member 38 secured thereto for movement therewith. Valve member 38 has a width equal to the distance between walls 20 and 22 and has an arcuate rectilinear outer end portion or valve surface 40 which is positioned closely adjacent the inside surface of wall 24. As seen in FIG. 5, the valve surface 40 of valve 38 has a length sufficient so as to seal both the discharge openings 28 and 30 at times to prevent air from being passed outwardly therefrom.

A pair of brackets 42 and 44 are secured to side wall 20 and have a bolt or shaft 46 provided at their outer ends. The numeral 48 refers to an elongated pendulum having a vertical portion 50 and a horizontal portion 52 extending inwardly from the upper end of vertical portion 50. Pendulum 48 is pivotally mounted to the bolt or shaft 46 and will be pivoted with respect thereto responsive to the lateral inclination of the combine.

The inner end of horizontal portion 52 of pendulum 48 is pivotally connected to the upper end of an arm 54 at 56. The lower end of arm 54 is pivotally connected to a crank arm 58 at 60. The other end of crank arm 58 is rigidly secured to one end of shaft 36 so that pivotal movement of the pendulum 48 about shaft 46 will cause the valve member 38 to be moved between the positions illustrated in FIGS. 7 and 9.

Conduits 32 and 34 are connected to manifolds 64 and 62 positioned at opposite sides of the chaffer unit so as to direct air over the chaffer unit in a manner described in U.S. Pat. Nos. 3,456,652; 3,495,598; and 3,608,558.

FIG. 6 illustrates the combine 10 in a level condition. In the level condition of FIG. 6, the pendulum 48 is in a vertically disposed position so that the valve member 38 is closing both of the discharge openings 28 and 30 to prevent air from being supplied to the manifolds 62 and 64. Referring to FIG. 8, the condition of the combine 10 is shown tilted to the level such as to effect an outward movement of the pendulum 48. The outward movement of the pendulum 48 to the position illustrated in FIG. 8 causes the valve member 38 to be rotated within the valve means so as to open discharge opening 30 so that air will be supplied to the conduit 34 and to manifold 62 which is the "down" manifold. In the condition illustrated in FIG. 8, a full flow of air is supplied from the down manifold 62 upwardly over the inclined chaffer unit 66 while shutting off the flow of air from the manifold 64. Referring to FIG. 10, the combine 10 is shown tilted to the right so as to effect an inward movement of the pendulum 48 with respect to the combine 10. The inward pivotal movement of the pendulum 48 to the position illustrated in FIG. 10 causes the valve member 38 to be rotatably moved within the valve means so as to close discharge opening 30 and to open discharge opening 28 so that a full flow of air will be supplied to the down manifold 64 while shutting off the flow of air from the upper manifold 62.

Thus it can be seen that an improved valve means has been provided for a blower assembly to permit air to be supplied to the lowermost manifold so as to maintain the grain on the chaffer unit in a level condition to achieve improved threshing and separating of the grain. Thus it can be seen that the valve means accomplishes at least all of its stated objectives.

I claim:

1. In a threshing machine mounted on a wheeled frame and having a housing within which a chaffer unit is conventionally mounted, an apparatus for opposing the lateral gravitational flow of grain over said chaffer unit due to a lateral inclination of the machine relative to a horizontal plane, the apparatus comprising:

blower means mounted on the machine and operable by the machine to pull in air from the atmosphere;

a single valve means comprising a housing and movable valve element within said housing; said housing having an inlet opening connected to said blower for receiving and transmitting air under pressure therefrom, said housing having first and second discharge openings positioned oppositely from said inlet opening, said housing forming a chamber having a greater cross sectional area than anyone of said inlet and discharge openings whereby said chamber supplies an excess of pressurized air beyond the demand served upon it by said discharge openings; said movable valve element being movable within said housing to open and close said discharge openings;

sensing means connected to said valve element for sensing changes in inclination of said machine and for causing said valve to open and close said discharge openings, said sensing means being directly connected to said valve element said valve element being immediately responsive to changes in inclination of said machine;

first and second conduits having one end thereof in communication with said first and second discharge openings respectively, first and second manifold means mounted on the machine on opposite sides of the chaffer unit for directing air across said chaffer unit, the other ends of said first and second conduits being connected to said first and second manifold means respectively.

2. The apparatus of claim 1 wherein said valve means comprises a cylindrical housing, said discharge openings being formed in the cylindrical wall of said housing, said valve member being rotatably mounted in said housing and having an arcuate valve surface adapted to open and close said discharge openings responsive to said lateral inclination.

3. The apparatus of claim 2 wherein a single pendulum means is pivotally mounted on said machine and is responsive to said lateral inclination, and linkage means interconnecting said pendulum means and said valve member whereby pivotal movement of said pendulum means will cause the rotational movement of said valve member.

4. The apparatus of claim 3 wherein said valve surface closes both of said first and second discharge openings when said machine is not laterally inclined.

5. The apparatus of claim 4 wherein said first and second discharge openings are vertically spaced, said valve member being rotatably mounted about a horizontal axis.

6. The apparatus of claim 5 wherein a horizontally disposed shaft rotatably extends through said housing, said valve member being secured to said shaft for rotation therewith, said linkage means being connected to said shaft so that pivotal movement of said pendulum means causes rotational movement of said shaft and valve member.

7. The apparatus of claim 1 wherein said sensing means is a pivotally mounted pendulum, linkage means positively and pivotally connecting said sensing means to said valve element so that a given increment of relative displacement of said pendulum caused by inclination of said threshing machine will cause a constant corresponding displacement of said valve element.

8. In a threshing machine mounted on a wheeled frame and having a housing within which a chaffer unit is conventionally mounted, an apparatus for opposing the lateral gravitational flow of grain over said chaffer unit due to a lateral inclination of the machine relative to a horizontal plane, the apparatus comprising:

a single valve means comprising a housing and movable valve element within said housing; said housing having an inlet opening connected to said blower for receiving and transmitting air under pressure therefrom, said housing having first and second discharge openings positioned oppositely from said inlet opening, said valve element having a rectilinear surface which is movable with respect to said discharge openings to effect the opening and closing thereof, sensing means connected to said valve element for sensing changes in inclination of said machine and for causing said valve to open and close said discharge openings; said sensing means being directly connected to said valve element, said valve element being immediately responsive to changes in inclination of said machine;

first and second conduits having one end thereof in communication with said first and second discharge openings respectively, first and second manifold means mounted on the machine on opposite sides of the chaffer unit for directing air across said chaffer unit, the other ends of said first and second conduits being connected to said first and second manifold means respectively.

* * * * *